US008562065B2

(12) United States Patent
Langenbacher et al.

(10) Patent No.: US 8,562,065 B2
(45) Date of Patent: Oct. 22, 2013

(54) VEHICLE TRIM PANEL HAVING BEVERAGE RETAINER AND METHOD

(75) Inventors: Kim Langenbacher, St. Clair Shores, MI (US); Steve Dreher, Brownstown, MI (US); Scott H. Dunham, Redford, MI (US); Ammad Bhatti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 13/115,512

(22) Filed: May 25, 2011

(65) Prior Publication Data

US 2012/0299324 A1    Nov. 29, 2012

(51) Int. Cl.
*B60J 5/00* (2006.01)

(52) U.S. Cl.
USPC ....................................................... 296/146.7

(58) Field of Classification Search
USPC .................. 296/146.7, 1.08, 39.1; 280/728.2, 280/728.3, 730.2, 732; 224/926; 24/297
See application file for complete search history.

(56) References Cited

U.S. PATENT DOCUMENTS

| | | | | | |
|---|---|---|---|---|---|
| 3,808,743 | A | * | 5/1974 | Renner et al. | 49/502 |
| 4,303,109 | A | * | 12/1981 | Cohen | 141/98 |
| 4,530,480 | A | * | 7/1985 | Pratt | 248/311.2 |
| 4,619,477 | A | * | 10/1986 | Kneib et al. | 296/37.13 |
| 4,630,319 | A | * | 12/1986 | Mathis | 2/250 |
| 4,634,089 | A | * | 1/1987 | Wright et al. | 248/311.2 |
| 4,645,157 | A | * | 2/1987 | Parker | 248/311.2 |
| 4,655,425 | A | * | 4/1987 | Wallace et al. | 248/311.2 |
| 4,678,154 | A | * | 7/1987 | McFarland | 248/311.2 |
| 4,712,823 | A | * | 12/1987 | Mills et al. | 296/37.8 |
| 4,724,986 | A | * | 2/1988 | Kahn | 224/544 |
| 4,728,018 | A | * | 3/1988 | Parker | 224/544 |
| 4,749,112 | A | * | 6/1988 | Harper | 224/553 |
| 4,779,831 | A | * | 10/1988 | Anderson | 248/311.2 |
| 4,801,060 | A | * | 1/1989 | Thompson | 224/275 |
| 4,844,400 | A | * | 7/1989 | Jasmagy, Jr. | 248/311.2 |
| 4,852,843 | A | * | 8/1989 | Chandler | 248/311.2 |
| 5,042,770 | A | * | 8/1991 | Louthan | 248/311.2 |
| 5,249,770 | A | * | 10/1993 | Louthan | 248/311.2 |
| 5,330,145 | A | * | 7/1994 | Evans et al. | 248/311.2 |

(Continued)

FOREIGN PATENT DOCUMENTS

| KR | 20010055591 A | 7/2001 |
|---|---|---|
| WO | 2005058649 A1 | 6/2005 |

OTHER PUBLICATIONS

2006 SRX Cadillac, Copyright: 2006: Harvey Schwartz—Editor, Automotive Addicts, http://www.automotiveaddicts.com/magazine/2006cadillacsrxtestdrive.html, 5 pages.

(Continued)

*Primary Examiner* — Kiran B Patel
(74) *Attorney, Agent, or Firm* — Vichit Chea; Price Heneveld LLP

(57) ABSTRACT

A vehicle trim panel assembly is provided having a beverage retainer formed in a storage compartment on the door of an automotive vehicle. The trim panel assembly includes a storage receptacle and a trim panel arranged to define at least a portion of the storage receptacle. The trim panel includes a base portion connected to a beverage retainer portion via a living hinge. The beverage retainer portion is pivoted about the living hinge into position within the storage receptacle.

9 Claims, 3 Drawing Sheets

(56) References Cited

U.S. PATENT DOCUMENTS

| | | | |
|---|---|---|---|
| 5,407,158 A * | 4/1995 | Baird | 248/205.5 |
| 5,494,249 A * | 2/1996 | Ozark et al. | 248/311.2 |
| 5,524,958 A * | 6/1996 | Wieczorek et al. | 297/188.17 |
| 5,833,194 A * | 11/1998 | Jones et al. | 248/311.2 |
| 6,116,672 A * | 9/2000 | Cannon et al. | 296/37.13 |
| 6,481,239 B2 * | 11/2002 | Hodosh et al. | 62/457.4 |
| 6,513,687 B1 * | 2/2003 | Siniarski | 224/282 |
| 6,560,983 B1 * | 5/2003 | Schimmeyer | 62/244 |
| 6,692,053 B1 * | 2/2004 | Smith | 296/37.1 |
| 6,715,726 B1 * | 4/2004 | Dybalski | 248/311.2 |
| 7,244,383 B2 * | 7/2007 | Youngs et al. | 264/255 |
| 7,517,002 B2 | 4/2009 | Reed et al. | |
| 7,537,258 B2 * | 5/2009 | Quijano et al. | 296/37.8 |
| 7,594,686 B2 * | 9/2009 | Augustyn | 296/37.13 |
| 7,681,939 B2 * | 3/2010 | Augustyn | 296/146.7 |
| 8,020,913 B2 * | 9/2011 | Kwolek | 296/70 |
| 8,066,148 B2 * | 11/2011 | Garahan | 220/737 |
| 2001/0025456 A1 * | 10/2001 | Furuyama et al. | 49/502 |
| 2004/0084458 A1 * | 5/2004 | Krueger et al. | 220/574 |
| 2005/0189459 A1 * | 9/2005 | Sturt et al. | 248/309.1 |
| 2005/0205739 A1 * | 9/2005 | DePue et al. | 248/311.2 |
| 2005/0224674 A1 * | 10/2005 | Park | 248/311.2 |
| 2006/0071497 A1 * | 4/2006 | Radu et al. | 296/24.34 |
| 2006/0201051 A1 * | 9/2006 | Cuomo | 43/43.11 |
| 2006/0214075 A1 * | 9/2006 | Cassettari et al. | 248/311.2 |
| 2007/0145760 A1 * | 6/2007 | Gresham et al. | 296/37.13 |
| 2007/0222249 A1 | 9/2007 | Valentage et al. | |
| 2009/0001748 A1 * | 1/2009 | Brown et al. | 296/37.8 |
| 2009/0108618 A1 * | 4/2009 | Hanson et al. | 296/72 |
| 2009/0140023 A1 * | 6/2009 | Noble | 224/482 |
| 2010/0225142 A1 * | 9/2010 | Mazur et al. | 296/146.7 |
| 2010/0314521 A1 * | 12/2010 | Pauken et al. | 248/316.1 |
| 2012/0126570 A1 * | 5/2012 | Nagamura et al. | 296/146.7 |
| 2013/0027955 A1 * | 1/2013 | Grote et al. | 362/510 |
| 2013/0027976 A1 * | 1/2013 | Robbins et al. | 362/612 |

OTHER PUBLICATIONS

2010 Lexus RX450h All-Wheel Drive; Car and Driver, http://www.caranddriver.com/reviews/car/09q3/2010_lexus_rx450_all-wheel_drive-short_take_road_test/gallery/2010_lexus_rx450h_door_storage_compartment_photo_50; Copyright ©2010 Hachette Filipacchi Media U.S., Inc., 5 pages.

* cited by examiner

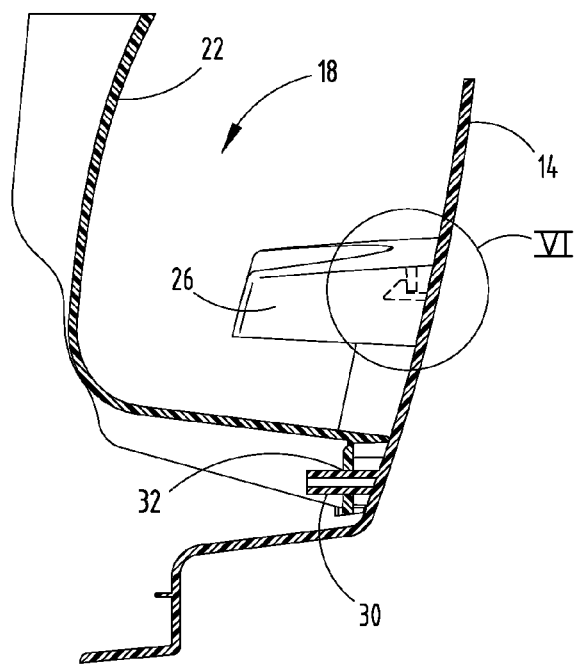
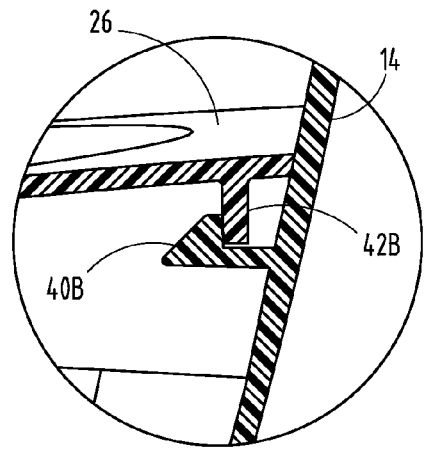
FIG. 5
FIG. 6
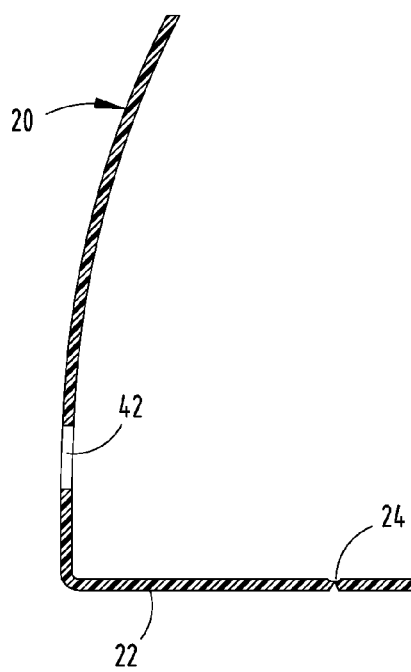
FIG. 7
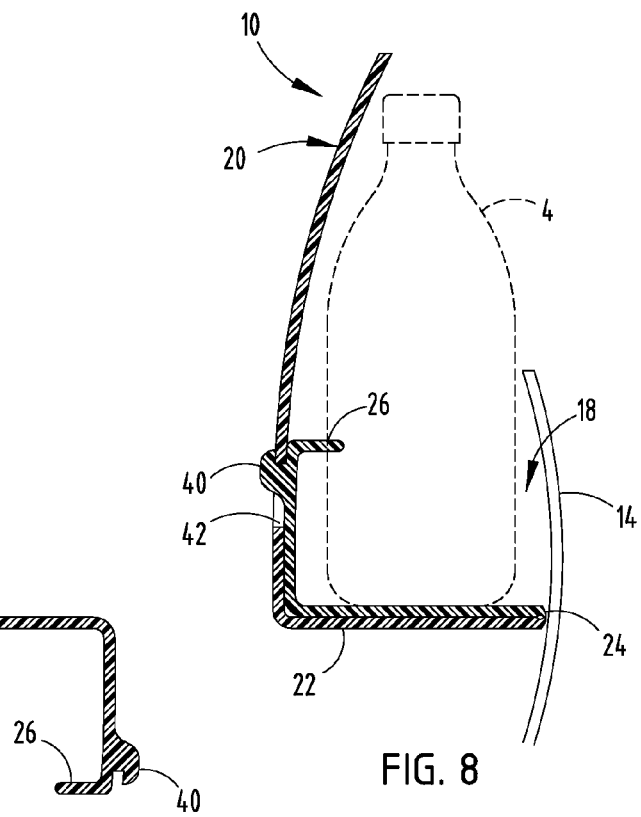
FIG. 8

VEHICLE TRIM PANEL HAVING BEVERAGE RETAINER AND METHOD

FIELD OF THE INVENTION

The present invention generally relates to vehicle storage receptacles and beverage holders, and more particularly relates to a vehicle trim panel having a beverage retainer provided within a storage receptacle.

BACKGROUND OF THE INVENTION

Automotive vehicles are commonly equipped with various trim components which provide aesthetically pleasing and functional features onboard the vehicle. For example, trim panels are assembled onto vehicle doors and configured to provide storage receptacles for storing items onboard the vehicle. Some storage receptacles are commonly referred to as map pockets that are configured to contain items stowed on the door such that the stowed items are easily accessible to passengers of the vehicle.

Some automotive vehicles also employ drink or beverage holders provided in the storage receptacles to retain beverage containers such that the containers do not tip over during vehicle acceleration or deceleration. However, conventional beverage holders are typically fabricated as separate pieces which require multiple parts and tooling to make and assemble the beverage holder and storage compartment and handle the parts during assembly. It is therefore desirable to provide for an enhanced storage receptacle with a beverage holder that employs reduced part, tooling and assembling costs.

SUMMARY OF THE INVENTION

According to one aspect of the present invention, a vehicle trim panel assembly is provided. The trim panel assembly includes a storage receptacle and a trim panel arranged to define at least a portion of the storage receptacle. The trim panel includes a base portion connected to a beverage retainer portion via a living hinge. The beverage retainer portion is pivoted about the living hinge into position within the storage receptacle.

According to another aspect of the present invention, a vehicle trim panel is provided. The trim panel includes a base portion, a beverage retainer portion and a living hinge. The living hinge is connected to the base portion and the beverage retainer portion. The beverage retainer portion is pivoted about the living hinge into position within the storage receptacle.

According to a further aspect of the present invention, a method of assembling a vehicle trim panel is provided. The method includes the step of forming a trim panel having a main portion, a beverage retainer portion, and a living hinge. The method further includes the step of rotating the beverage retainer portion about the living hinge into a beverage retainer position. The method further includes the step of assembling the trim panel onto a vehicle such that the beverage retainer portion is disposed into a position within a storage receptacle.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 5 is a cross-sectional view through the assembly further illustrating the connection of the inner and outer trim panels;

FIG. 6 is an enlarged view of section VI of FIG. 5 further illustrating the connection of the beverage retainer;

FIG. 7 is a schematic view of a molded trim panel formed with a beverage retainer portion for an outboard retainer embodiment; and FIG. 8 is a cross-sectional view taken through a trim assembly employing the outboard retainer embodiment of FIG. 7.

DETAILED DESCRIPTION OF PREFERRED EMBODIMENTS

Figure 1:
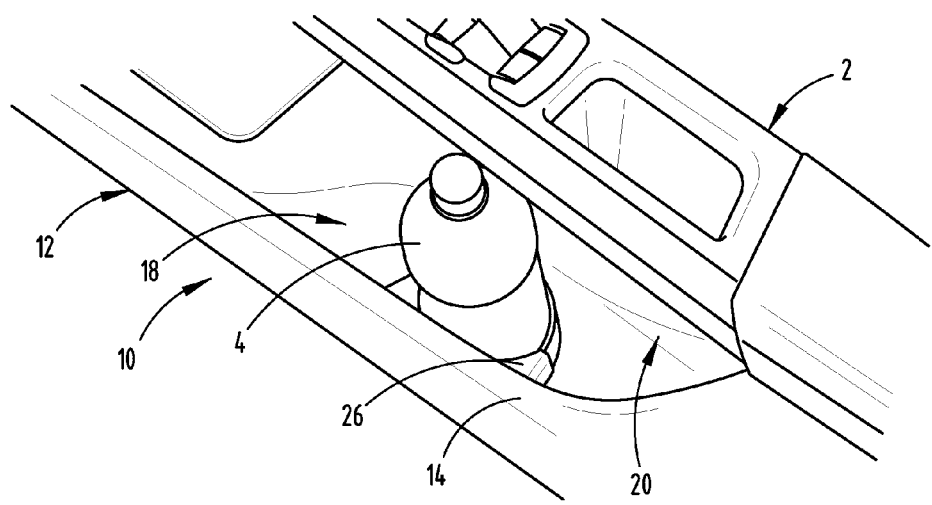
FIG. 1 is a elevated perspective view of a vehicle door employing a storage receptacle with a beverage retainer provided therein, according to one embodiment.
Figure 2:
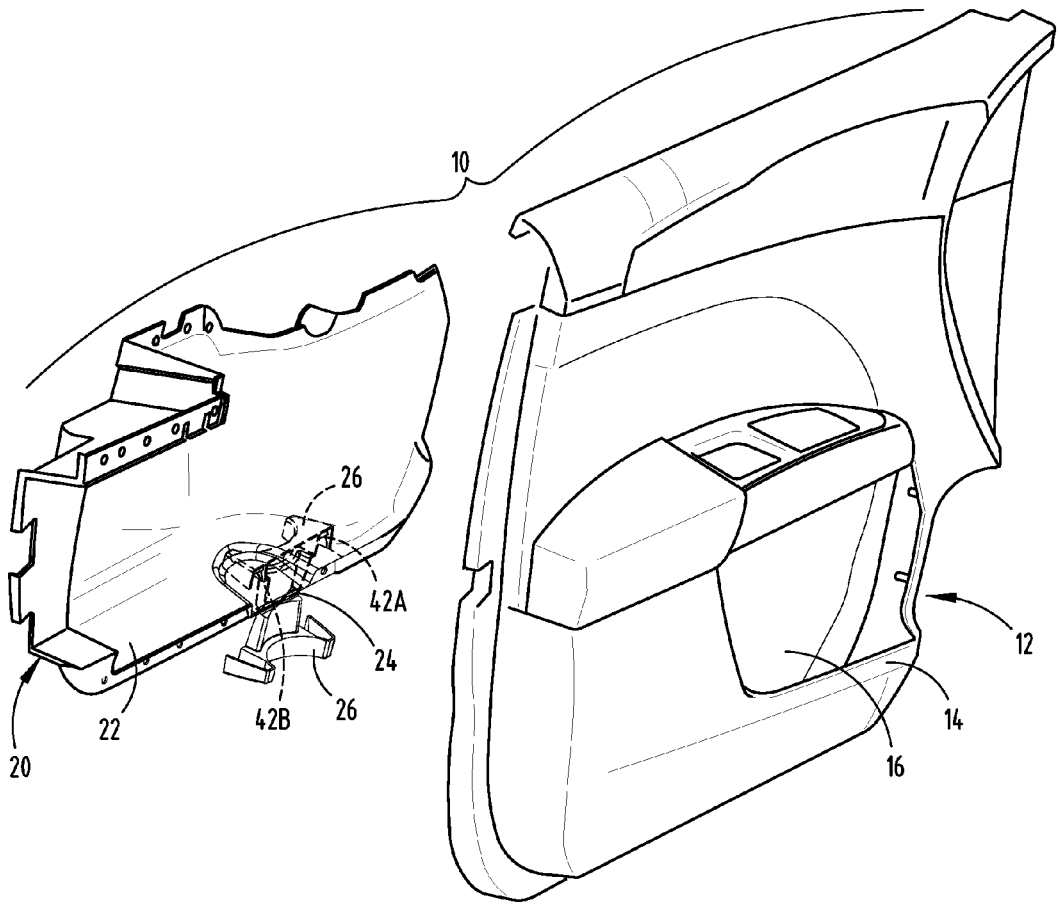
FIG. 2 is an exploded outer perspective view of the door illustrating an outer trim panel and an inner trim panel forming the storage receptacle.
Figure 3:
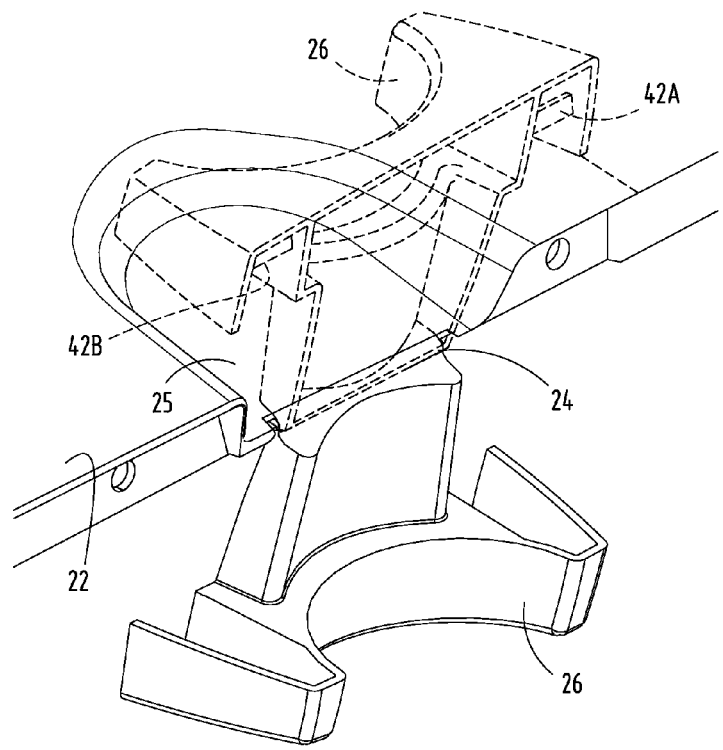
FIG. 3 is an enlarged perspective view of the outer trim panel showing the beverage retainer portion in a molded position and a pivoted beverage retainer position.

For purposes of description herein, the terms "inner," "outer," "upper," "lower," "right," "left," "rear," "front," "vertical," "horizontal," and derivatives thereof shall relate to the vehicle door and the trim panel assembly with storage receptacle and beverage retainer as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A vehicle trim panel assembly is shown and described herein having a storage receptacle and a trim panel arranged to define at least a portion of the storage receptacle. The trim panel has a base portion connected to a beverage retainer portion via a living hinge. The beverage retainer portion is pivoted about the living hinge into position within the storage receptacle. A vehicle trim panel is also disclosed which includes a base portion, a beverage retainer portion, and a living hinge connected to the base portion and the beverage retainer portion. The beverage retainer portion is pivoted about the living hinge into position within a storage receptacle. A method of assembling a vehicle trim panel is further disclosed which includes forming a trim panel having a main portion, a beverage retainer portion, and a living hinge, rotating the beverage retainer portion about the living hinge into a beverage retainer position, and assembling the trim panel onto a vehicle such that the beverage retainer portion is disposed into the beverage retainer position within a storage receptacle.

Referring to FIGS. 1-6, an automotive vehicle door trim assembly 10 is illustrated having a storage compartment or receptacle 18 and a beverage retainer 26 provided therein, according to one embodiment. As seen in FIG. 1, the trim assembly 10 is provided in the interior side of the vehicle door 2 such that the storage receptacle 18 and beverage retainer 26 is easily accessible to a passenger in the passenger compartment of the vehicle. The storage receptacle 18 is shown provided within the trim assembly 10 generally below the armrest of door 2. It should be appreciated that each door of the vehicle may include a door trim assembly 10 for storing items within one or more storage receptacles 18 and for steadily holding a beverage container 4 within each of one or more beverage retainers 26. It should further be appreciated that the trim assembly 10 may be employed at other locations on board the vehicle such as in the center console or dash, and may provide any number of storage receptacles and beverage retainers according to other embodiments.

The trim assembly 10 generally includes a first or inner trim panel 12 provided on the interior side of the door and a second or outer trim panel 20 provided outward of the inner panel 12 and assembled to the rear side of the inner trim panel 12. The rear trim panel 20 includes a base portion 22 with a shape that defines a substantial bottom and rear portion of the storage receptacle 18. The inner trim panel 12 has an inner upstanding wall 14 which defines an inner wall of the storage compartment 18. As such, the storage compartment defined by base portion 22 and inner upstanding wall 14 defines a storage receptacle 18 for receiving items of storage on the door 2.

Figure 4:
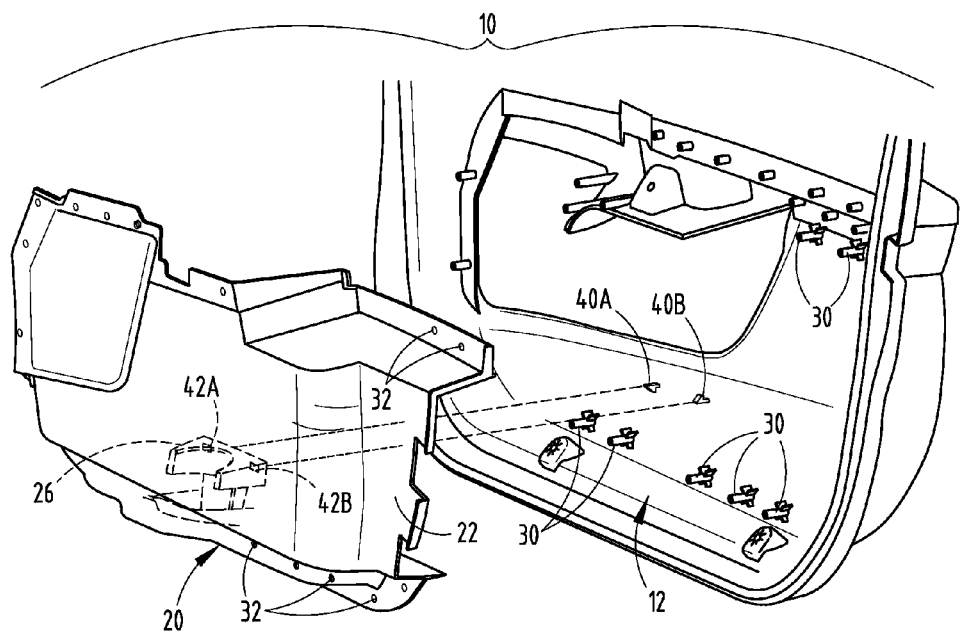
FIG. 4 is an exploded inner perspective view of the trim assembly further illustrating rotation of the beverage retainer.

The outer trim panel 20 includes the base portion 22 that defines at least a portion of the storage receptacle and a beverage retainer portion 26 that is connected to the base portion 22 via a living hinge 24. Base portion 22 has a recessed bottom portion 25 sized and shaped to receive the bottom side of the beverage container 4. The beverage retainer portion 26 pivots approximately 180° relative to base portion 22 about the living hinge 24 into a beverage retainer position that is substantially vertical as shown in FIG. 4 to fit within the storage receptacle 18. The outer trim panel 20 is formed of a moldable material such that the base portion 22, beverage retainer portion 26 and living hinge 24 may be integrally formed by a molding process, such as injection molding. Base portion 22 may be made of a moldable polymer, such as plastic, according to one embodiment. The living hinge 24 may have a thin portion that forms a U-shape when the beverage retainer portion 26 is pivoted to its beverage retainer position, according to one embodiment. The living hinge 24 has a reduced thickness area that this allows for the pivoting motion of the beverage retainer portion 26 relative to the base portion 22 during assembly.

Referring to FIG. 4, the outer trim panel 20 is shown positioned for assembly onto the rear or outer side of the inner trim panel 12. The inner trim panel 12 has a plurality of connectors, such as male pins 30 positioned to engage and connect to a plurality of female receptacles or openings 32 provided in the outer trim panel 20. The beverage retainer portion 26 of the outer trim panel 20 is pivoted relative to the base portion 22 about the living hinge 24 from its substantially planar molded position to an upward beverage retainer position as shown during assembly. The outer trim panel 20 is then aligned such that the holes 32 in outer trim panel 20 are matingly engaged with connectors 30 of the inner trim panel 12 and fastened thereto to provide the assembled trim assembly 10. Referring to FIG. 5, the assembled parts are shown connected together in which the male connector 30 is fully engaged within the female connector 32 to assemble the outer trim panel 22 to the inner trim panel 14. It should be appreciated that a plurality of connectors 30 and 32 are provided to sufficiently hold the outer trim panel 22 steadily in place relative to the inner panel 14, and that any of a number of connector members may be employed.

The rear side of the inner trim panel 12 has a pair of snap fit male retention members 40A and 40B which are aligned to matingly connect with female connectors 42A and 42B on the inner side wall of the beverage retainer portion 26. According to one embodiment, the snap fit connectors 40A and 40B are male connectors that bias into a snap fit connection within female receptacles 42A and 42B on the beverage retainer portion 26. In this embodiment, the snap fit connectors 40A and 40B have prongs, one of which faces down and the other of which faces up. As seen in FIG. 6, snap fit connector 40B matingly engages with female connector 42B to provide a locking connection that holds the beverage retainer 26 fixed in place against the inner trim panel 14. It should be appreciated that various other shaped and sized connectors may be employed to retain beverage retainer 26 in place within the storage receptacle 18. Accordingly, during assembly of the outer trim panel 20 to the rear side of the inner trim panel 12, the beverage retainer portion 26 is snap fit connected onto the inner trim panel 12 to provide for secured assembly of the beverage retainer 26 within the storage receptacle 18.

In the embodiment shown, the storage receptacle 18 is formed as a map pocket in a vehicle door. The storage receptacle 18 may have a desired shape and size configured to receive various items for storage that are easily accessible to a user within the passenger compartment of the vehicle. The beverage retainer 26 has a shape and size configured to receive a standard beverage container 4 such as a soda bottle or traveling beverage container. The size and shape of the beverage retainer 4 may vary depending upon the size and shape of desired beverage containers to retain therein. According to the embodiment shown, the beverage retainer 26 is assembled on the inboard or inner side of the storage receptacle 18 such that the beverage retainer 26 retains the beverage container 4 from the inner side of the door 2, and the base portion 22 of the outer trim panel 20 provides an upstanding, vertical rear supporting surface to prevent the beverage container 4 from moving outward. The beverage retainer portion 26 has a semi-circular shape that partially encircles the container 4 to sufficiently retains the beverage container 4 to prevent the container 4 from tipping over during acceleration or deceleration of the vehicle under normal driving conditions.

According to another embodiment, the beverage retainer 26 may be formed and assembled to engage a beverage container 4 on the outboard or outer side of the storage receptacle 18 as shown in FIGS. 7 and 8. In FIG. 7, the outer trim panel 20 is shown formed having a base portion 22, a beverage retainer portion 26 and an interconnecting living hinge 24. The beverage retainer portion 26 may pivot approximately 180° relative to base portion 22 and back onto the base portion 22. The beverage retainer portion 26 may then be connected to the outer side of the base member 22 of the outer trim panel 20 such as by snap fit connections 40 and 42 or other connections. Upstanding wall 14 may be provided by an inner trim panel to form the inner wall of storage receptacle 18 and support the beverage container 4 on the inner side.

Accordingly, the vehicle trim panel assembly 10 and trim panel advantageously provides for an integrally formed beverage retainer 26 within a storage compartment 18 of a vehicle in a manner that is easy to produce and requires fewer components. The vehicle trim panel assembly 10 and method advantageously allows for beverage container 5 to be stabilized within the storage receptacle 18 without the need for a separate piece, multiple tooling and part number setup, packaging and handling. It should be appreciated that the beverage retainer 26 can be recessed flush into the bottom and vertical side wall 14 of the map pocket 18 to provide a clean craftsmanship appearance in which the living hinge 24 is hidden from view.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle door trim panel assembly comprising:
   a storage receptacle; and
   an outer door trim panel arranged to define at least a portion of the storage receptacle and comprising a base portion connected to a beverage retainer portion via a living hinge, wherein the beverage retainer portion is pivoted about the living hinge into position within the storage receptacle.

2. The trim panel assembly of claim 1, wherein the outer trim panel is assembled to a vehicle door.

3. The trim panel assembly of claim 2, wherein the storage receptacle is formed by an inner door trim panel and the outer door trim panel.

4. The trim panel assembly of claim 2, wherein the storage receptacle is a map pocket.

5. The trim panel assembly of claim 1, wherein the outer door trim panel is molded to integrally form the base portion, the beverage retainer portion and the living hinge.

6. The trim panel assembly of claim 1, wherein the beverage retainer portion is snap fit into engagement within the storage receptacle.

7. The trim panel assembly of claim 6, wherein the beverage retainer portion is matingly snap fit into connection with a wall of the storage receptacle.

8. The trim panel assembly of claim 1, wherein the beverage retainer portion connects to the inner door trim panel via male and female connectors.

9. The trim panel assembly of claim 8, wherein the male connectors comprise prongs that snap-fit into the female connectors, wherein one of the prongs faces up and the other of the prongs faces down.

* * * * *